United States Patent
Thyagarajan et al.

(10) Patent No.: US 7,801,076 B2
(45) Date of Patent: Sep. 21, 2010

(54) ALLOCATION OF SIGNAL-TO-NOISE RATIO MARGIN IN MULTI-CARRIER SYSTEMS

(75) Inventors: Umashankar Thyagarajan, Munich (DE); Frenzel Rudi, Munich (DE); Bernd Heise, Munich (DE); Axel Clausen, Munich (DE)

(73) Assignee: Infineon Technologies AG, Munich (DE)

( * ) Notice: Subject to any disclaimer, the term of this patent is extended or adjusted under 35 U.S.C. 154(b) by 649 days.

(21) Appl. No.: 11/803,538

(22) Filed: May 15, 2007

(65) Prior Publication Data

US 2008/0285510 A1 Nov. 20, 2008

(51) Int. Cl.
*H04W 4/00* (2009.01)
(52) U.S. Cl. ....................... 370/329; 370/332
(58) Field of Classification Search .......... None
See application file for complete search history.

(56) References Cited

U.S. PATENT DOCUMENTS

| | | | |
|---|---|---|---|
| 2004/0240464 A1* | 12/2004 | Fite | 370/438 |
| 2006/0215742 A1* | 9/2006 | Modlin | 375/222 |
| 2007/0110176 A1* | 5/2007 | Wu et al. | 375/260 |

* cited by examiner

*Primary Examiner*—Erika A Gary
(74) *Attorney, Agent, or Firm*—Slater & Matsil, L.L.P.

(57) ABSTRACT

Allocation of different signal-to-noise margins to different carriers in a multi-carrier system is described. A preferred embodiment comprises assigning signal-to-noise ratio (SNR) margins to carriers in a multi-carrier system, comprises assigning a first SNR margin to a first data service based upon a first service characteristic, assigning a second SNR margin to a second data service based upon a second service characteristic, transmitting data associated with the first data service using the first signal-to-noise margin, and transmitting data associated with the second data service using the second signal-to-noise margin.

20 Claims, 4 Drawing Sheets

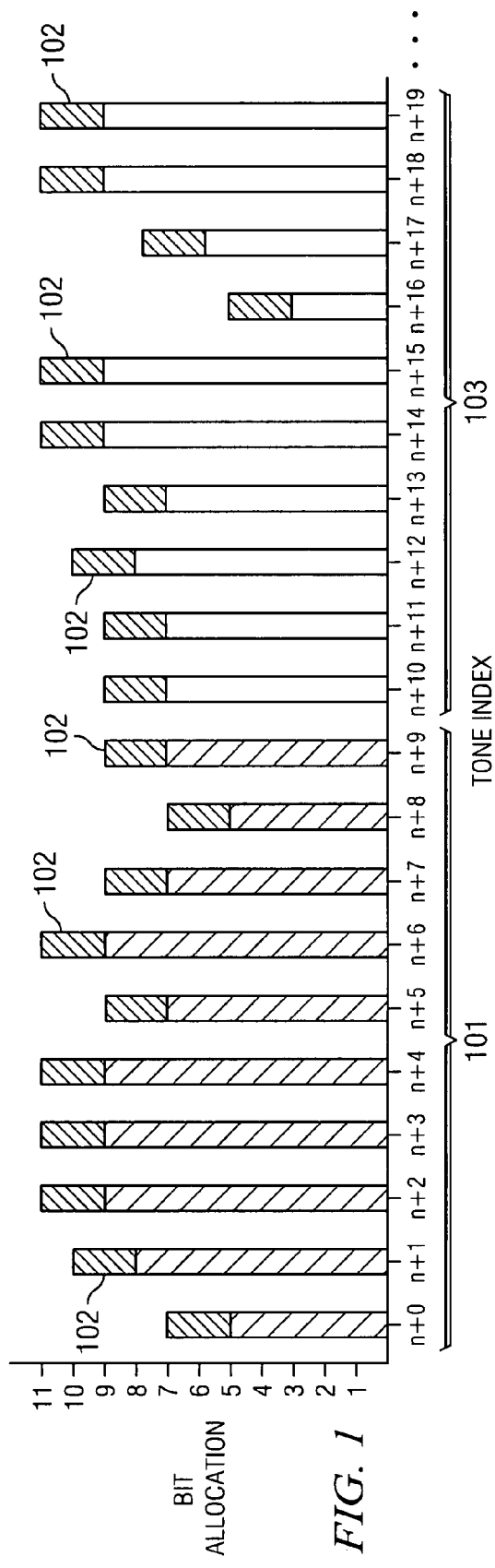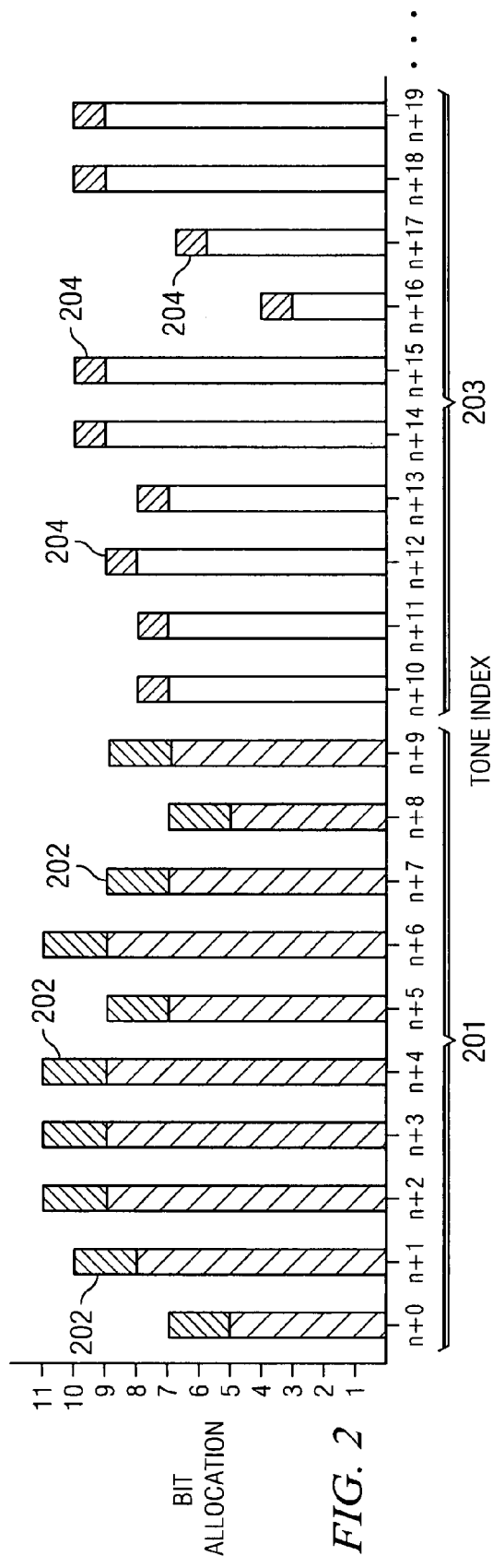

ALLOCATION OF SIGNAL-TO-NOISE RATIO MARGIN IN MULTI-CARRIER SYSTEMS

BACKGROUND

In a digital communication system, digital data is converted to analog signals by modulating the data onto a carrier. The modulated carrier is then transmitted over a physical medium, such as copper wires or a wireless radio frequency (RF) connection. The physical medium may be divided into bands, wherein each band is assigned to one or more carriers, tones, or sub-carriers. The amount of data that is allocated to a specific bandwidth depends upon the ratio between the signal power associated with the carrier and the noise power in that band. This parameter is referred to as Signal-to-Noise Ratio (SNR).

In order to achieve good performance in channels with high noise levels, the reliability of the system may be increased using techniques such as modulation, coding, or assigning an SNR margin. SNR margin is the additional SNR available for a communication channel after modulating the carrier with a data signal. For example, if a channel has a SNR of 15 dB, but is allotted 10 dB of data, the additional 5 dB is referred to as SNR margin or SNRM. SNR margin is a measure of a communications system's immunity to noise. Increasing the amount of data, while maintaining the same bandwidth results in a smaller SNR margin. As a result, the system can tolerate less noise before bit errors begin to occur.

SNR margin is used to mitigate the effects of crosstalk and other signal impairments that occur during transmission. SNR margin may be used, for example, for noise mitigation in multi-carrier systems, such as Asymmetric Digital Subscriber Line (ADSL) or Very high speed Digital Subscriber Line (VDSL) systems, which use Discrete Multi-Tone (DMT) modulation. Using SNR margin in a communication system presents a trade-off between data-rate efficiency and noise mitigation. In a multi-carrier system, the allocation of bits on each sub-carrier depends on the SNR available for that sub-carrier. Often, for the sake of link stability, the total available SNR is not used for bit loading. Instead, only a portion of the SNR is used for bit loading, and the remaining SNR on the sub-carrier is used to mitigate impairments. The unused SNR is the SNR margin. In one embodiment, 3 dB corresponds to one bit of data. Accordingly, for each 3 dB of SNR margin, one less bit of data is being transmitted on that channel.

SUMMARY OF THE INVENTION

Embodiments of the present invention allocate a SNR margin based upon the data service type assigned to a particular carrier. Embodiments of the present invention may allow a system operator to evaluate how much data (or how many bits) needs to be modulated, how much protection/redundancy is incorporated into the data, and latency limits for the data types and, based upon those factors, to allocate SNR margin to individual sub-carriers.

For example, according to an embodiment, a system may transmit one or more data types, such as voice data and Internet browser data, over a single physical connection. The data is assigned to separate carriers on the physical connection. The desired or acceptable latency for the data varies depending upon the data type. Latency for voice data may be minimized so that delays are not apparent to the user, but latency for Internet browser data is less critical and less apparent to the user. The acceptable error rates may also vary depending upon the data service. Errors in voice data will often allow the user to still receive the message, whereas errors in Internet browser data may cause a complete failure of a message. The amount of data protection assigned to different data types may vary which will affect the amount of data to be transferred. The addition of data protection or redundant bits, such as Reed Solomon coding or interleaving, correspondingly reduces the need for SNR margin. The reduced SNR margin can be used to transmit more data on the channel. For example, if the SNR margin was reduced by 6 dB on a channel, then two more bits of data, such as error protection data, could be transmitted on that channel.

BRIEF DESCRIPTION OF THE DRAWINGS

For a more complete understanding of the present invention, and the advantages thereof, reference is now made to the following descriptions taken in conjunction with the accompanying drawing, in which:

FIG. 1 illustrates bits and SNR margin assigned to tones in a multi-carrier communication system;

FIG. 2 illustrates bits and SNR margin assigned to tones in a multi-carrier communication system according to embodiments of the present invention;

DETAILED DESCRIPTION OF ILLUSTRATIVE EMBODIMENTS

Figure 3:
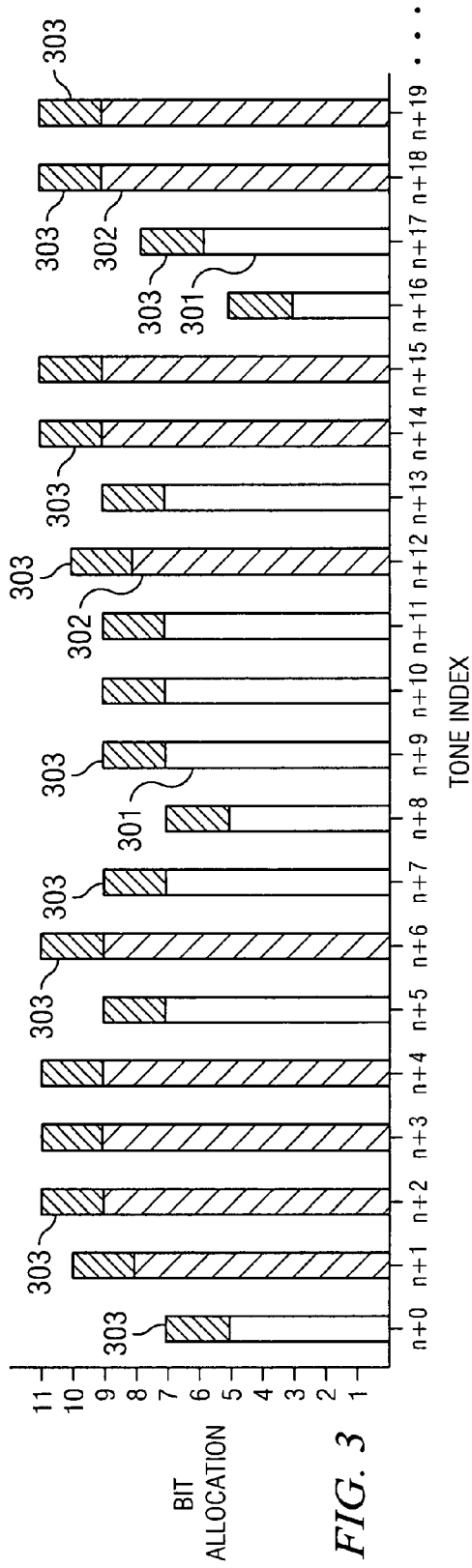
FIG. 3 illustrates bits and SNR margin assigned to tones in a multi-carrier communication system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. The present invention is be described below with respect to embodiments in exemplary systems, such as an ADSL or VDSL communication system. The invention may also be applied, however, to any other wireline or wireless multi-carrier communication system.

Many transmission techniques, including DSL communications systems, have the capability to transfer multiple types of services, such as voice or data services, on the same physical medium. For example, a VDSL or ADSL system may transmit voice information over the same physical medium, such as a pair of copper wires, that are also used to transmit Internet data. The different services transmitted in the communication system typically have different data rate requirements, different latency requirements, different traffic types, and/or different Bit Error Rate (BER) requirements. Although the service requirements for various data types are different, the same physical medium is used for all of the data types and existing systems assign a single SNR margin to all data types on the physical medium. Such a constraint causes inefficient use of bandwidth. Different services prioritize different parameters. For example, one service may prioritize data rate over latency, while another may prioritize BER over latency.

When two data services have different or opposing requirements, such as one service requiring low latency but accepting a high BER, and another service accepting high latency but requiring a very low bit error rate, it is inefficient to use the same noise mitigation parameters for the both services. Using the same SNR margin for both services often leads to suboptimal performance for one or both of the services. For channels with high stationary or fluctuating non-impulsive type noise and less impulse noise, using techniques such as trellis coding, SNR margin can improve the system performance. Whereas, interleaving and Reed Solomon (RS) coding provide limited improvement in quality of service at best on the same channel. In a channel with high impulse noise and low fluctuating noise, interleaving in combination with Reed Solomon coding improves the channel quality, but SNR margin provides little benefit.

Embodiments of the present invention use different SNR margins for different types of services. The amount of protection given to each service can be customized based on the requirements of that service. For example, in DSL systems, services can be classified in different latency paths. Latency paths in DSL transmission, such as in ADSL (ITU G.992.1, 992.2, 992.3, 992.4, 992.5) and VDSL (ITU G.993.1, 993.2) systems, are specified based on the delay for each path, data rate, Reed Solomon and noise protection. Embodiments of the present invention use different SNR margins for different types of services. This technique can also be applied to include different SNR margins for different transmission bands in a composite band plan, different SNR margins for different parts of the same transmission band, or different SNR margins per sub-carrier. Embodiments of the present invention provide a customizable noise margin for each type of service to ensure that the available bandwidth is not wasted.

FIG. 1 illustrates a distribution of carriers where the data service is allocated according to a "natural" tone ordering. That is, a first data service is assigned to a first group of carriers with lower frequency n=0 to n=9. Each of signals 101 is assigned the same SNR margin 102. Signals 103 associated with a second data service are assigned to a second group of carriers with higher frequency. Signals 103 are also assigned SNR margin 102, because, in existing systems, all of the signals on the same physical medium are assigned the same SNR margin. Signals 101 may correspond to a data service having a first latency, a first BER, a first data rate, or a first traffic type; and signals 103 may correspond to a data service having a second latency, a second BER, a second data rate, or a second traffic type.

FIG. 2 illustrates the distribution of data signals according to an embodiment of the present corresponding to FIG. 1 with "natural" tone ordering. Signals 201 and 203 represent data signals distributed among sub-carriers or tones on a physical medium. Signals 201 are allocated SNR margin 202, which is selected based upon the latency, BER, data rate, or traffic type of the service being transmitted on carriers n to n+9. On the other hand, signals 203 are allocated SNR margin 204, which is selected based upon the latency, BER, data rate, or traffic type of the service being transmitted on carriers n+10 to n+19.

Signals 201 correspond to a data service having a first latency, a first BER, a first data rate, or a first traffic type; and signals 203 correspond to a data service having a second latency, a second BER, a second data rate, or a second traffic type. SNR margin 204 may be less than SNR margin 202, for example, if the service type of signals 203 does not require as much SNR margin as the service type of signals 201. For example, signals 201 may provide a low latency at the cost of BER or data rate, whereas signals 203 may provide better BER or data rate at the expense of latency. In one embodiment, signals 201 correspond to voice signals that require low latency, and signals 203 correspond to webpage data that requires a low BER and high data rate. Accordingly, larger SNR margin 202 is appropriate for the voice service, and smaller SNR margin 204 is appropriate for the data service. By optimizing the SNR margin assigned to different services, the available bandwidth is used more efficiently.

In one embodiment, this technique may be applied in a DSL communication system in which data bits for different latency paths are distributed over several sub-carriers in a certain order. For example, in the ADSL1 (ITU-G.992.1) and VDSL1 (ITU-TG.993.1) standards, the data bits for "fast-path" services are assigned first, beginning with the tones having the lowest bit allocation. Then data for "interleaved-path" services are distributed to tones with higher bit allocations. For example, referring to FIG. 3, fast-path services are assigned to tones 301, which correspond to the tones or sub-carriers on a physical medium that have the lowest bit allocations. Then, interleaved-path services are assigned to tones 302, which have higher bit allocations.

The ADSL1 and VDSL1 standards apply a tone-reordering mechanism that defines the sequence of carriers in which the data bits are modulated, starting with fast-path data first and followed by interleaved-path data. In existing systems, only one SNR margin 303 is available for use by both of these latency paths. Accordingly, all tones 301 and 302 are assigned SNR margin 303. The application of an SNR margin is useful for fast-path services, which do not include much interleaving or RS coding; however, for interleaved-path services, data protection is primarily dependent on interleaving and RS coding. As a result, the use of SNR margin for interleaved-path services is less than optimal.

FIG. 3 illustrates a distribution of data signals among sub-carriers or tones on a physical medium. FIG. 3 may represent, for example, the SNR margin allocation for ADSL1- and VDSL1-based systems. Signals associated with a first data service are allocated to a first group of tones or sub-carriers 301 that have a lower number of bits assigned. Each of the signals are assigned the same SNR margin 303. Signals associated with a second data service are allocated to a second group of tones or sub-carriers 302 that have a higher number of bits assigned. Tones 302 are also assigned SNR margin 303, because, in existing systems, all of the signals on the same physical medium are assigned the same SNR margin. Signals 301 may correspond to a data service having a first latency, a first BER, a first data rate, or a first traffic type; and signals 302 may correspond to a data service having a second latency, a second BER, a second data rate, or a second traffic type. SNR margin 303 may be appropriate for signals 301, if signals 301 benefit from SNR margin protection. However, SNR margin 303 may not be appropriate for signals 302, if signals 302 are already protected by RS coding or some data redundancy. In such a scenario, the use of SNR margin 303 with signals 302 is a waste of bandwidth that could otherwise carry useful data.

Figure 4:
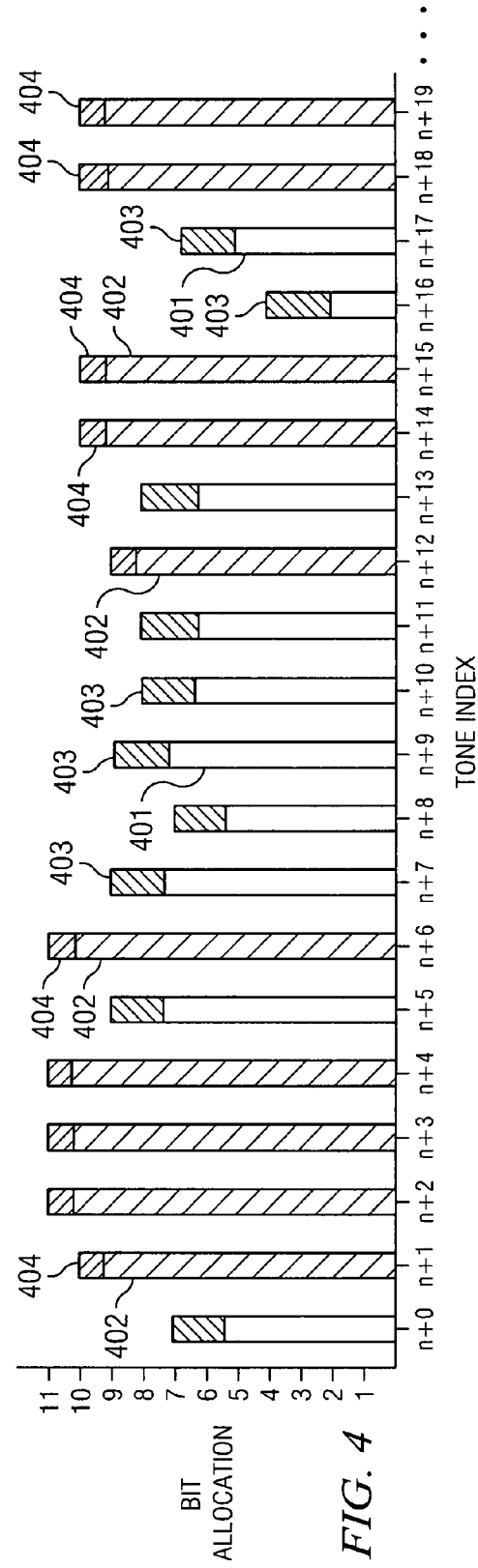
FIG. 4 illustrates bits and SNR margin assigned to tones in a multi-carrier communication system according to embodiments of the present invention.

Instead of splitting the available SNR between data bits and SNR margin, impulse noise protection may be available by using RS or other encoding, which would allow for reduced SNR margin. FIG. 4 illustrates an embodiment wherein a variable SNR margin is assigned to signals in, for example, an ADSL1 or VDSL1 system. As illustrated in FIG. 4, carriers 401 of the first group have a lower bit loading and are assigned to a first service type having a first SNR margin 403. Carriers 402 of a second group having higher bit loading are assigned to a second service type having second SNR margin 404 that is different from first SNR margin 403. In one embodiment, the data carried by the service assigned to tones 402 uses data protection, such as RS coding or interleaving, and, therefore, has less need for SNR margin. Accordingly, tones 402 are assigned a smaller SNR margin 404. On the other hand, the data carried by the service assigned to tones 401 does not have additional data projection and, therefore, a larger SNR margin 403 is allocated to those tones.

Figure 5:
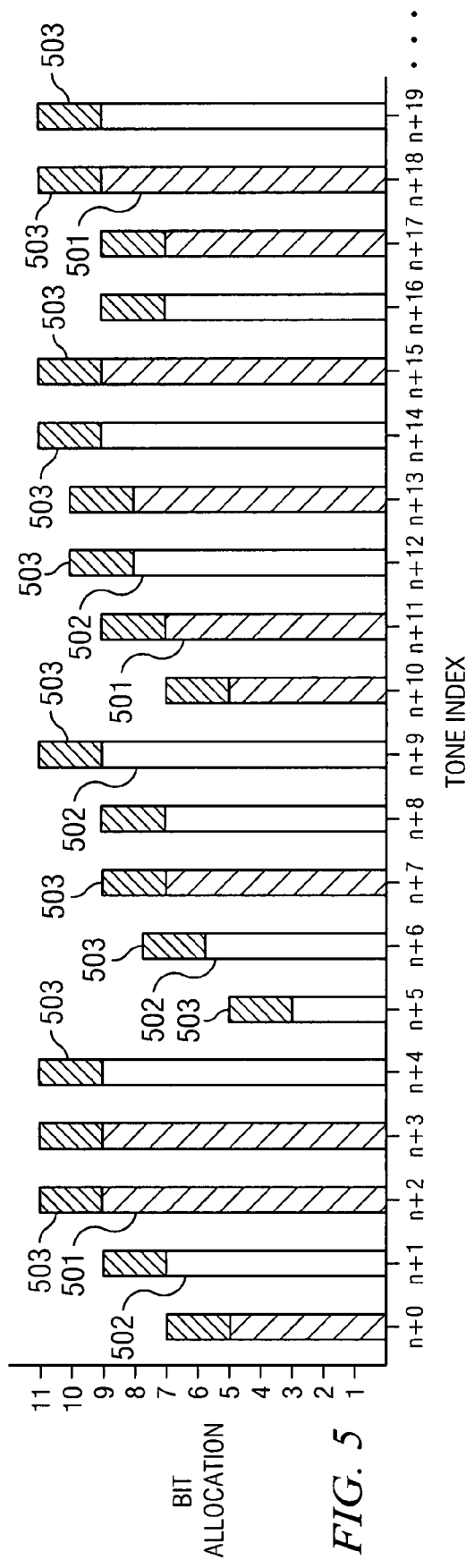
FIG. 5 illustrates bits and SNR margin assigned to tones in a multi-carrier communication system.

FIG. 5 illustrates signals of a known system, which may for example be a ADSL2/VDSL2 system, distributed among sub-carriers n to n+19, which are on the same physical medium. Unlike the tone assignment illustrated in FIG. 1a, the data bits in FIG. 5 are distributed over the tones by a tone-ordering algorithm which may for example be determined by a receiver. Tones having data bits of a first latency 501 are interleaved with tones having data bits of a second latency 502. Accordingly, tones carrying consecutive bits for a data service or latency path may be spread across the entire available bandwidth on the physical medium. In the existing systems, all of the tones are assigned the same SNR margin 503 without regard to the data service or latency path of the underlying data.

Embodiments of the present invention are effective to improve such systems by allowing the system to assign SNR margin based on the data service or latency path associated with sub-carriers, even when the sub-carriers carrying bits for the same service are spread out across the spectrum. Embodiments of the present invention provide a technique to customize SNR margin for a service channel (i.e. latency/bearer channel) based on the service requirements of the data carried on the channel. Embodiments of the invention allow for band-specific and data-service-specific SNR margin allocation.

Figure 6:
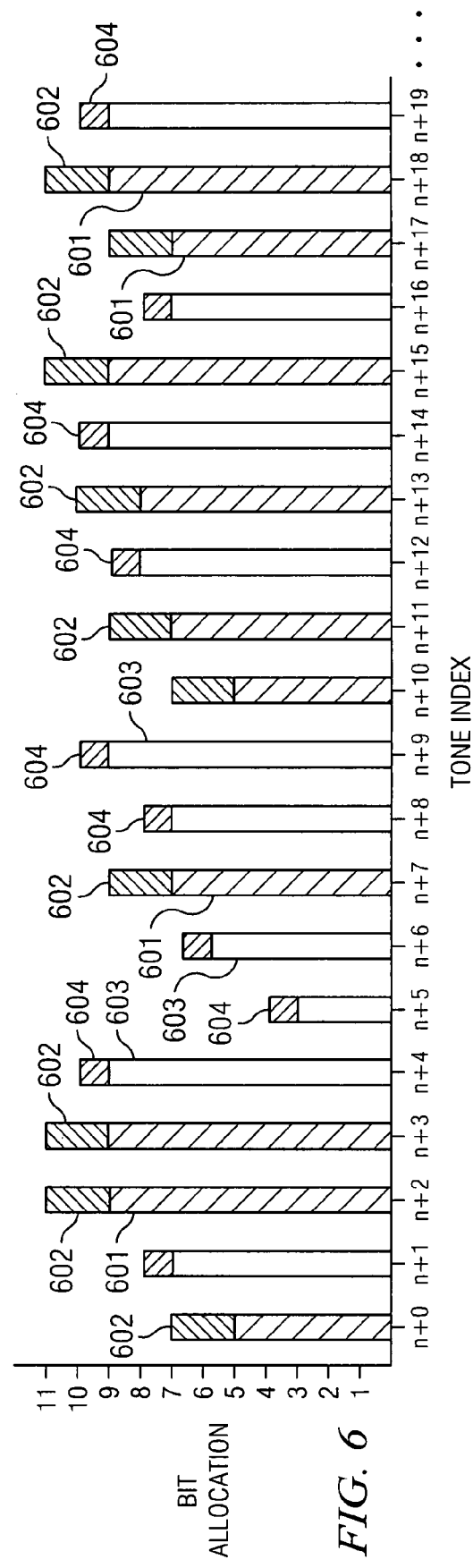
FIG. 6 illustrates bits and SNR margin assigned to tones in a multi-carrier communication system according to another embodiment of the invention.

FIG. 6 illustrates the SNR margin allocation for an ADSL2/VDSL2 system according to one embodiment of the invention. Signals in an ADSL2/VDSL2 system are distributed among sub-carriers n to n+19 on the same physical medium. The data bits are distributed over the sub-carriers or tones using a tone-ordering algorithm. Tones having data bits of a first latency 601 are interleaved with tones having data bits of a second latency 603. Tones carrying consecutive bits for a data service or latency path are spread across the entire available bandwidth on the physical medium. According to embodiments of the present invention, the tones are assigned an SNR margin based upon the underlying service or latency path. Signals assigned to latency path 601 are allocated SNR margin 602, and signals assigned to latency path 603 are allocated SNR margin 604. Like the SNR margin allocation of FIG. 2, the allocation in FIG. 6 allows the communication system or service provider to evaluate the trade-offs between allocating excess SNR margin and using available bandwidth to send data.

According to an embodiment, the embodiments described in FIGS. 4 and 6 may use trellis-coded modulation. For example, in systems using 4-dimensional trellis-coded modulation, two tones are be provided to the trellis coder at the same. The Viterbi decoder would equalize the SNR margin for the tone pairs. It is possible that the tones paired for input to the trellis coder may be assigned to two different services and, therefore, two different SNR margin allocations. This will lead to a condition in which the SNR margins for the different tones are equalized by the Viterbi decoder. In order to avoid such a condition, the following two solutions are proposed.

According to one embodiment, a separate trellis encoder may be used for every group of tone sets assigned to a particular SNR margin. By doing so, only tones carrying the same SNR margin are paired together and provided to a respective encoder, therefore, the SNR margins are not changed.

In another embodiment, tones having the same SNR margin are encoded in batches using the same encoder. For example, if two SNR margins are specified, tones carrying data with the first SNR margin will be encoded together first, followed by the tones carrying the second SNR margin. In this way, the trellis pair will contain tones having the same SNR margin. According to one embodiment, the tones which are encoded first may be carrying the higher SNR margin of the two SNR margins. According to another embodiment, the tones which are encoded first may be carrying the lower SNR margin of the two SNR margins. It is to be noted that in the embodiment described with respect to FIG. 6, a reordering of the tones is performed in order to provide the tones of the first group assigned to a first SNR margin sequentially to the trellis encoder and thereafter the tones of the second group assigned to the second SNR margin sequentially to the trellis encoder.

Since the tones are provided in pairs to the encoder, there is a possibility that there could be at least one tone pair containing tones from two different SNR margins. This would occur if there were an odd number of tones assigned to each SNR margin. In this case, according to one embodiment, the one tone pair containing different SNR margins may be maintained without adapting SNR margins. According to a further embodiment, the one tone pair containing different SNR margins may be adapted to have the same SNR margin, either the smaller or the higher one of the different SNR margins.

Figure 7:
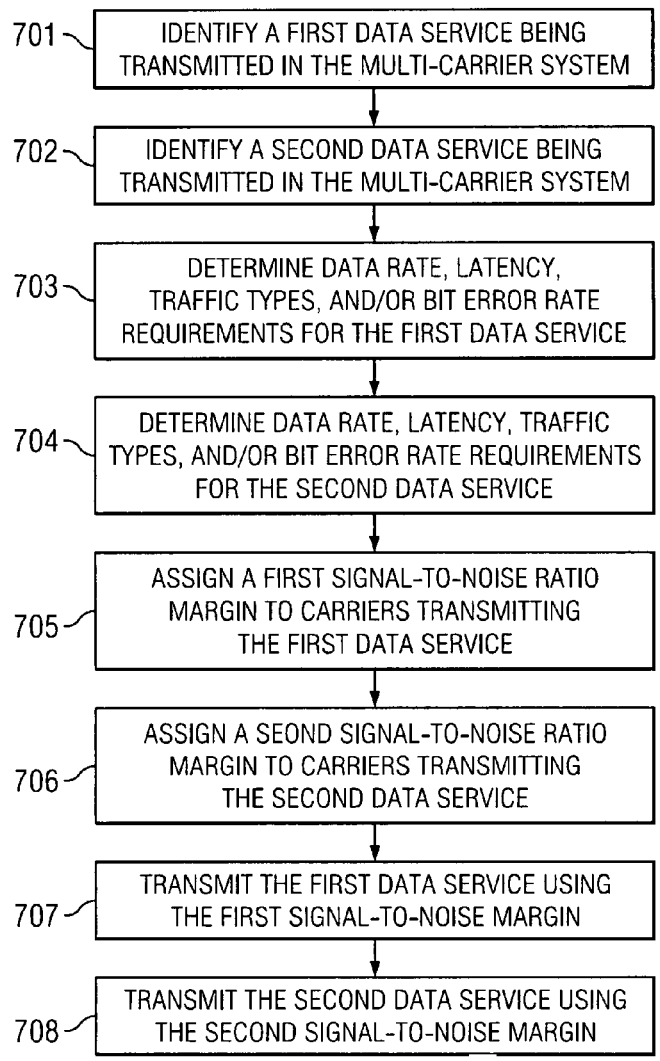
FIG. 7 is a flowchart illustrating a method of using one embodiment of the present invention.

FIG. 7 is a flowchart illustrating a method of implementing embodiments of the present invention in a multi-carrier communication system. First the system identifies first and second data services that are transmitted in the multi-carrier system (701, 702). Then the system determines a data rate, latency, traffic type, and/or bit error rate requirement for the first and second data services (703, 704). It is expected that these parameters will vary for the two different data services and that the SNR requirements of each data service will be different. The system, then assigns a first SNR margin to the carriers assigned to transmit the first data service and a second SNR margin to the carriers assigned to transmit the second data service (705, 706). The carriers may be assigned in any manner appropriate for the communication system, such as by grouping the carriers for each data service together (e.g. FIG. 4) or by interleaving carriers for each data service (e.g. FIG. 6). The system then transmits the first and second data service so that carriers having the first data service use the first signal-to-noise margin, and carriers having the second data service use the second signal-to-noise margin (707, 708).

Figure 8:
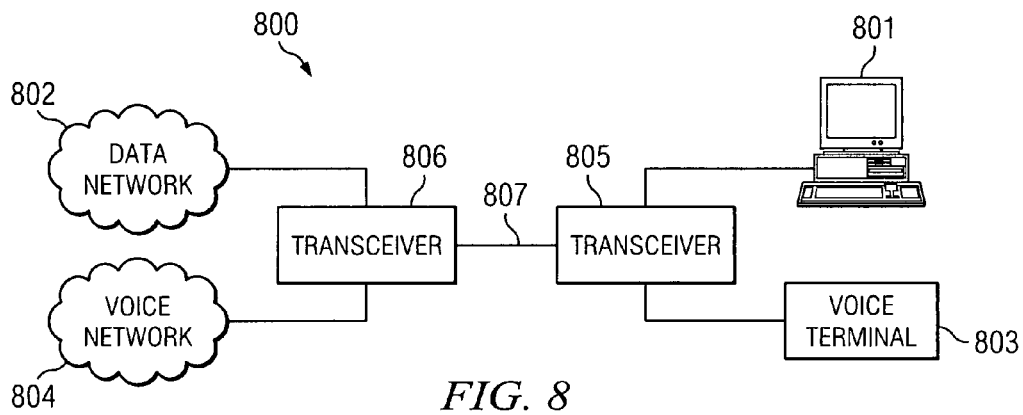
FIG. 8 is a block diagram of a system incorporating one embodiment of the invention for assigning SNR margin to carriers.

FIG. 8 is a block diagram of a system incorporating one embodiment of the present invention. Data terminal 801 communicates with data network 802 using a first data service. Voice terminal 803 communicates with voice network 804 using a second data service. Transceiver 805 receives data from data terminal 801 and transmits it to transceiver 806, which routes the data to network 802. Transceiver 806 receives data from network 802 and forwards the data to transceiver 805, which routes the data to terminal 801. Similarly, transceiver 805 and 806 facilitate the exchange of data between voice terminal 803 and voice network 804. Transceivers 805 and 806 may be comprised of splitters, filters, modulators, demodulators, and processors as is known to those of ordinary skill in the art. For example, network 800 may be an ADSL or VDSL network, and transceivers 805 and 806 may be ADSL or VDSL transceivers.

Transceiver 805 assigns data from data terminal 801 to a first set of carriers on communication link 807, which may be subsequent or non-subsequent carriers. Transceiver 805 assigns data from voice terminal 803 to a second set of carrier on communication link 807. Transceiver 805 maintains a first SNR margin for the first set of carrier frequencies, wherein the first SNR margin is selected based upon characteristics of the first data service from data terminal 801. Transceiver 805 maintains a second SNR margin for the second set of carrier frequencies, wherein the second SNR margin is selected based upon characteristics of the second data service from data terminal 801. The characteristics of the data service may include a data rate, a latency requirement, a traffic type, or a bit error rate limitation impulse noise protection, retransmission techniques etc. The first set of carrier frequencies and the second set of carrier frequencies may be separated into separate groups or may be interleaved on link 807. Transceiver 806 also maintains different SNR margins for data being sent from networks 802 and 804 to transceiver 805. The SNR margin for a data service sent from transceiver 805 to transceiver 806 may be different than the SNR margins used for the same data service when sent from transceiver 806 to transceiver 805.

Those of ordinary skill in the art will understand that the present invention may also be applied to systems that are transmitting more than two forms of data across a physical connection and to any data types that are being transmitted, including, without limitation, voice, sound, video, photos, multimedia, HTML, text, or telemetry data or the like. Thus, while the exemplary embodiments used herein describe an assignment of two SNR margins to carriers or tones, it is to be understood that in other embodiments more than two different SNR margins may be assigned to the available carriers or tones.

Although the exemplary embodiments used herein relate to ADSL or VDSL systems, it will be understood by those of ordinary skill in the art that the SNR margin techniques disclosed herein may be applied to any wireline or wireless multi-carrier communication system. The terms carrier, sub-carrier and tone as used herein will be understood to be interchangeable and to refer to sub-divisions of a communication channel on a wireline or wireless communication link.

Although embodiments of the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for assigning signal-to-noise ratio (SNR) margins to carriers in a multi-carrier system, comprising:
   assigning a first SNR margin to a first data service based upon a first service characteristic;
   assigning a second SNR margin to a second data service based upon a second service characteristic;
   modulating a first group of carriers and a second group of carriers using a trellis coder, wherein carriers of the first group of carriers are modulated, and thereafter carriers of the second group of carriers are modulated;
   transmitting data associated with the first data service on the first group of carriers using the first signal-to-noise margin; and
   transmitting data associated with the second data service on the second group of carriers using the second signal-to-noise margin.

2. The method of claim 1, wherein the first and second service characteristics are selected from the group consisting of:
   a data rate;
   a latency requirement;
   a traffic type; impulse noise protection; retransmission techniques and
   a bit error rate requirement.

3. The method of claim 1, wherein the first group of carriers and the second group of carriers are transmitted on the same physical medium.

4. The method of claim 3, wherein the physical medium is a wireline connection.

5. The method of claim 3, wherein the physical medium is a wireless connection.

6. The method of claim 3, wherein the first group of carriers are assigned to a first set of sequential frequencies, and the second group of carriers are assigned to a second set of sequential frequencies.

7. The method of claim 3, wherein the first group of carriers and the second group of carriers are assigned to non-subsequent frequencies.

8. The method of claim 3, wherein the first signal-to-noise margin is higher than the second signal-to-noise margin.

9. The method according to claim 3, wherein the first group of carriers and the second group of carriers are assigned to non-subsequent frequencies and wherein the carriers are reordered for trellis code modulation.

10. The method of claim 1, further comprising:
    identifying a third data service being transmitted in the multi-carrier system;
    determining a third service characteristic for the third data service;
    assigning a third SNR margin to the third data service based upon the third service characteristic; and
    transmitting the third data service using the third signal-to-noise margin.

11. The method of claim 1, wherein the multi-carrier system is an Asymmetric Digital Subscriber Line (ADSL) system or a Very high speed Digital Subscriber Line (VDSL) system.

12. A method for allocating signal-to-noise (SNR) margin, comprising:
    identifying a first data service being transmitted in a multi-carrier system;
    identifying a second data service being transmitted in the multi-carrier system;
    determining a first service characteristic for the first data service;
    determining a second service characteristic for the second data service;
    assigning a first SNR margin to the first data service based upon the first service characteristic;
    assigning a second SNR margin to the second data service based upon the second service characteristic;

modulating a first group of carriers and a second group of carriers using a trellis coder, wherein carriers of the first group of carriers are modulated, and thereafter carriers of the second group of carriers are modulated;

transmitting the first data service on the first group of carriers using the first signal-to- noise margin; and transmitting the second data service on the second group of carriers using the second signal-to-noise margin.

13. The method of claim 12, wherein the first and second service characteristics are selected from the group consisting of:

a data rate;
a latency requirement;
a traffic type; and
a bit error rate requirement.

14. The method of claim 12, wherein the first group of carriers and the second group of carriers are transmitted on the same physical medium.

15. The method of claim 12, wherein the first group of carriers are assigned to a first set of sequential frequencies, and the second group of carriers are assigned to a second set of sequential frequencies.

16. The method of claim 12, wherein the first group of carriers and the second group of carriers are assigned to non-subsequent frequencies.

17. A transceiver for transmitting data in a multi-carrier system, comprising:

a first apparatus to assign a first SNR margin to a first data service based upon a first service characteristic;

a second apparatus to assign a second SNR margin to a second data service based upon a second service characteristic;

a modulator to modulate a first group of carriers and a second group of carriers using a trellis coder, wherein carriers of the first group of carriers are modulated, and thereafter carriers of the second group of carriers are modulated; and a transmitter to transmit, to a remote transceiver, data complying with the first data service on the first group of carriers using the first signal-to-noise margin, and to transmit, to the remote transceiver, data complying with the second data service on the second group of carriers using the second signal-to-noise margin.

18. The transceiver of claim 17, further comprising:

a receiver to receive, from the remote transceiver, data complying with the first data service, wherein the received data is assigned a third SNR margin.

19. The transceiver of claim 17, wherein the multi-carrier system is an Asymmetric Digital Subscriber Line (ADSL) system or a Very high speed Digital Subscriber Line (VDSL) system.

20. The transceiver of claim 17, wherein the first and second service characteristics are selected from the group consisting of:

a data rate;
a latency requirement;
a traffic type; and
a bit error rate requirement.

* * * * *